Feb. 22, 1972    B. E. NOWAK ET AL    3,644,593
COMPOSITIONS OF MATTER COMPRISING OXYBENZOYL POLYESTERS
AND POLYFLUORINATED ADDITION POLYMERS
Filed May 28, 1969
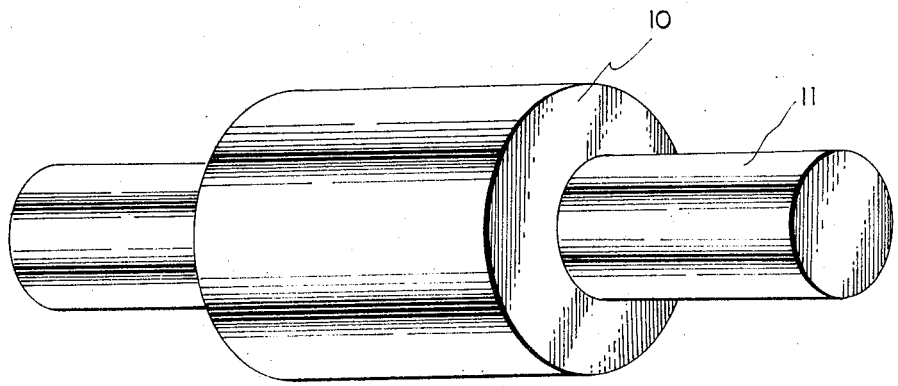
INVENTORS
BERNARD EDWARD NOWAK
STEVE GUST COTTIS
JAMES ECONOMY
PAUL JOSEPH STEINER
BY
ATTORNEY United States Patent Office 3,644,593
Patented Feb. 22, 1972

3,644,593
COMPOSITIONS OF MATTER COMPRISING OXYBENZOYL POLYESTERS AND POLYFLUORINATED ADDITION POLYMERS
Bernard E. Nowak, Lancaster, Steve G. Cottis and James Economy, Buffalo, and Paul J. Steiner, Snyder, N.Y., assignors to The Carborundum Company, Niagara Falls, N.Y.
Filed May 28, 1969, Ser. No. 828,691
Int. Cl. C08f 29/22
U.S. Cl. 260—900
20 Claims

ABSTRACT OF THE DISCLOSURE

A composition of matter comprising:
(A) an oxybenzoyl polyester and
(B) a polyfluorinated addition polymer which is thermally stable at at least 400° F.

DISCLOSURE

Oxybenzoyl polyesters are well-known in the art. Unfortunately, these prior polyesters suffer from a number of disadvantages due principally to their low molecular weight. According to recently discovered techniques, practical methods have been provided for producing high molecular weight oxybenzoyl polyesters. Unfortunately, these polyesters when used in pure form suffer from a number of disadvantages such as brittleness, low flexural strength and low PV limit.

Polytetrafluoroethylene was developed some years ago as the first practical thermally stable polyfluorinated addition polymer having a useful temperature of 300 to 500° F. It offered the advantages of high lubricity and good corrosion resistance at these temperatures. Unfortunately, polytetrafluoroethylene suffers from a number of disadvantages such as its low wear resistance, low PV limits and high creep. These properties have retarded wider use of these materials as bearings.

It is therefore an object of the present invention to provide an improved composition of matter which is substantially free of one or more of the disadvantages of polytetrafluoroethylene and oxybenzoyl polyesters.

Another object is to provide an improved composition of matter which is heat resistant and wear resistant.

A further object is to provide an improved composition of matter which has a high PV limit.

A still further object is to provide an improved high temperature bearing which does not require lubrication.

Additional objects and advantages of the present invention will be apparent by reference to the following detailed description thereof.

According to the present invention there is provided a composition of matter comprising:
(A) an oxybenzoyl polyester, and
(B) a thermally stable polyfluorinated addition polymer.

It has been surprisingly discovered that such compositions have PV limits of over 60,000 p.s.i.-ft./min. Furthermore bearings of such compositions can operate for long periods of time at high temperatures without lubrication.

The oxybenzoyl polyester and the polyfluorinated addition polymer can be admixed in widely varying weight ratios such as 1:100 to 100:1, but are preferably combined in a ratio of 1:10 to 10:1. When operating outside these ranges little advantage over the pure oxybenzoyl polyester or the pure addition polymer is observed whereas within the preferred range these novel compositions of matter exhibit higher PV limits than either of the pure materials.

The oxybenzoyl polyesters useful in the present invention are generally those of repeating units of Formula I:

(I)
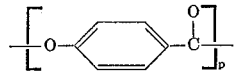

One preferred class of oxybenzoyl polyesters are those of Formula II:

(II)
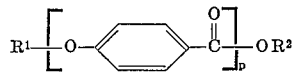

wherein $R^1$ is a member selected from the group consisting of benzoyl, lower alkanoyl, or preferably hydrogen; wherein $R^2$ is hydrogen, benzyl, lower alkyl, or preferably phenyl and $p$ is an integer from 3 to 600 and preferably 30 to 200. These values of $p$ correspond to a molecular weight of about 1,000 to 72,000 and preferably 3,500 to 25,000. The synthesis of these polyesters is described in detail in U.S. patent application Ser. No. 619,577 filed Mar. 1, 1967, now abandoned, entitled "Polyesters Based on Hydroxybenzoic Acids," the disclosure of which is incorporated herein by reference.

Another preferred class of oxybenzoyl polyesters are copolyesters of recurring units of Formulae I, III and IV:

(III)
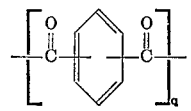

(IV)
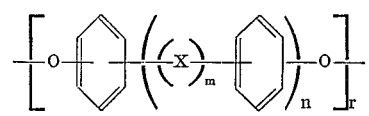

wherein X is —O— or —$SO_2$—; $m$ is 0 or 1; $n$ is 0 or 1; $q:r=10:15$ to $15:10$; $p:q=1:100$ to $100:1$; $p+q+r=3$ to 600 and preferably 30 to 200. The carbonyl groups of the moiety of Formula I or III are linked to the oxy groups of a moiety of Formula I or IV; the oxy groups of the moiety of Formula I or IV are linked to the carbonyl groups of the moiety of Formula I or III.

The preferred copolyesters are those of recurring units of Formula V:

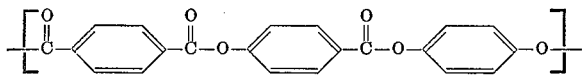

The synthesis of these polyesters is described in detail in U.S. patent application Ser. No. 828,484 filed concurrently herewith entitled "P-Oxybenzoyl Copolyesters" the disclosure of which is incorporated herein by reference.

The polyesters useful in the present invention can also be chemically modified by various means such as by inclusion in the polyester of monofunctional reactants such as benzoic acid or tri- or higher functional reactants such as trimesic acid or cyanuric chloride. The benzene rings in these polyesters are preferably unsubstituted but can be substituted with non-interfering substituents examples of which include among others halogen such as chlorine or bromine, lower alkoxy such as methoxy and lower alkyl such as methyl.

The preferred perfluorinated addition polymers are those which are stable to at least 400° F. and preferably at least 500° F., and which have mean molecular weights of over 100,000. These polymers are formed by the addition polymerization of one or more unsaturated halogenated monomers such as tetrafluoroethylene, perfluoropropylene, chlorotrifluoroethylene and vinylidene fluoride. The halogenated monomers are mixed in ratios such that at least 80 mole percent of the halogen units in the resultant polymer are fluorine. The preferred addition polymers are polytetrafluoroethylene such as that available as Teflon® TL 126 and a copolymer of tetrafluoroethylene and perfluoropropylene available as Teflon® TL 120. The polytetrafluoroethylene useful in the composition of matter of the present invention is generally recognized as the polymer consisting essentially of recurring units of Formula VI:

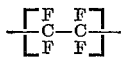

The compositions of matter of the present invention can be fabricated by a number of processes but are preferably formed by mixing granular polyester and granular addition polymer followed by compaction at pressures of 4000 to 7000 p.s.i. at high temperatures such as those within the range of 100 to 400° C. These compositions of matter can also be formed into useful shapes by impact molding or plasma spraying. The polyester and the addition polymer can have widely varying particle sizes but generally have an average maximum dimension of $0.01\mu$ to $50\mu$ and preferably $1\mu$ to $10\mu$.

The compositions of the present invention can in addition contain fillers in amounts up to 70 wt. percent based on combined weight of composition and filler. Examples of suitable fillers include among others metals such as bronze; high temperature resistant solid lubricants such as graphite or molybdenum disulfide; and glass fibers as well as combinations of two or more of the above. By judicious choice of type and amount of filler characteristics such as the thermal coefficient of expansion, wear resistance and PV limits of these compositions can be altered.

The term "PV" as used herein is the product of the bearing pressure in p.s.i. and the sliding velocity in ft./min. "PV limit" is the maximum value of PV at which the bearing will operate without lubrication and without failure for two days. Unless otherwise indicated it is measured at 70 to 80° F. However, one of the outstanding characteristics of the compositions of the present invention is their high PV limit at high temperatures.

The term "lower" as used herein in "lower alkyl" or "lower alkanoyl" refers to a carbon atom content of from 1 to 6. The compositions of the present invention can also be employed to produce a wide variety of other objects such as lubricious coatings on household utensils such as frying pans, baking pans, and the like, and can be employed as substitutes for polytetrafluoroethylene.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

Example 1

A mixture of 856 g. of phenyl para-hydroxybenzoate, 0.015 g. of tetra-n-butyl orthotitanate and 1800 g. of a polychlorinated polyphenyl solvent (B.P. 360–370° C.) is heated, with constant stirring and under an atmosphere of flowing nitrogen, at 170–190° C. for 4 hours and then at 340–360° C. for 10 hours. Early in this heating cycle the mixture becomes a homogeneous liquid. During the heating cycle condensation occurs, accompanied by the distillation of phenol, and the polyester which is produced thereby forms a precipitate. The mixture is cooled to room temperature and extracted with acetone to remove the polychlorinated polyphenyl solvent, and the product is dried overnight in vacuum at 60° C. A yield of 377 g. of polyester powder is obtained, consisting essentially of a para-oxybenzoyl polyester.

Example 2

This example illustrates the synthesis of a copolyester useful in the present invention.

The following quantities of the following ingredients are combined as indicated:

| Item | Ingredient | Quantity Grams | Moles |
|---|---|---|---|
| A | p-Hydroxybenzoic acid | 138 | 1 |
| B | Phenyl acetate | 170 | 1.25 |
| C | Therminol 77 | 500 | |
| D | Diphenyl terephthalate | 318 | 1 |
| E | Hydrogen chloride | | |
| F | Hydroquinone | 111 | 1.01 |
| G | Therminol 77 | 500 | |

Items A–D are charged to a four-necked, round bottom flask fitted with a thermometer, a stirrer, a combined nitrogen and HCl inlet and an outlet connected to a condenser. Nitrogen is passed slowly through the inlet. The flask and its contents are heated to 180° C. whereupon HCl is bubbled through the reaction mixture. The outlet head temperature is kept at 110°–120° C. by external heating during the p-hydroxybenzoic acid, phenyl acetate ester exchange reaction.

The flask and its contents are stirred at 180° C. for 6 hours whereupon the HCl is shut off, the outlet head temperature raised to 180°–190° C. and the mixture stirred at 220° C. for 3.5 hours. Up to this point, 159 grams of distillate are collected in the condenser. Item F is then added and the temperature gradually increased from 220° C. to 320° C. over a period of 10 hours (10° C./hr.). Stirring is continued at 320° C. for 16 hours and then for three additional hours at 340° C. to form a slurry. The total amount of distillate, consisting of phenol, acetic acid and phenyl acetate, amounts to 384 g. Item G is added and the reaction mixture permitted to cool to 70° C. Acetone (750 ml.) is added and the slurry filtered, the solids are extracted in a Soxhlet with acetone to remove items C and G. The solids are dried in vacuo at 110° C. overnight whereupon the resultant copolyester (320 g. 89.2% of theory) is recovered as a granular powder.

Example 3

Referring now to the single figure of the drawing the polyester of Example 1 (700 g.) is mixed with polytetrafluoroethylene (300 g.) to form a composition of the present invention which is then impact molded into a cylinder 10. A hole is drilled in the cylinder and a shaft 11 inserted in the hole. The cylinder functions satisfactorily as a bearing. The PV limit of this composition is found to be between 60,000 and 70,000 p.s.i.-ft./min. compared to 12,000 for a cylinder of the above polyester alone and 1,000 for a cylinder of the polytetrafluoroethylene alone.

Example 4

Example 3 is repeated except that the polyester of Example 1 is replaced by an equal weight of the copolyester of Example 2 with similar results.

Thus from the foregoing it can be seen that the compositions of the present invention exhibit unexpectedly high PV limits. These compositions also exhibit advantageously low thermal coefficients of expansion with the result that bearing tolerances are maintained throughout a wide range of temperatures. Furthermore these compositions exhibit advantageously high coefficients of thermal conductance such that heat of friction is rapidly dissipated. This unique combination of properties gives exceptionally long life to all types of bearings including among others sleeve bearings and thrust bearings and especially those operating under conditions where the use of lubricants is impossible or undesirable.

Although the invention has been described in considerable detail with reference to certain preferred embodiments thereof, it will be understood that variations and modifications can be effected within the spirit and scope of the invention as described above and as defined in the appended claims.

What is claimed is:
1. A composition of mater comprising:
(A) An oxybenzoyl polyester selected from the group consisting of:
(a) a polyester consisting essentially of recurring structural units of the formula

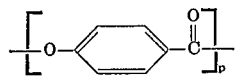

wherein $p$ is an integer from 30 to 200 and
(b) a polyester consisting essentially of recurring structural units of Formulas I, III and IV (I) 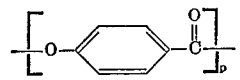

(III) 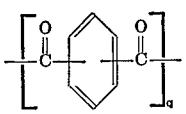

(IV) 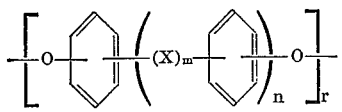

wherein X is —O— or —SO$_2$—; $m$ is 0 or 1; $q{:}r=10{:}15$ to $15{:}10$; $p{:}q=1{:}100$ to $100{:}1$; $p+q+r=30$ to 200; the carbonyl groups of the moiety of Formula I or III are linked to the oxy groups of the moiety of Formula I or IV; and the oxy groups of the moiety of Formula I or IV are linked to the carbonyl groups of the moiety of Formula I or III; and
(B) A polyfluorinated addition polymer of at least one unsaturated halogenated monomer selected from the group consisting of tetrafluoroethylene, perfluoropropylene, chlorotrifluoroethylene and vinylidene fluoride, said polymer being thermally stable to at least 400° F., and at least 80 mole percent of the halogen units in said polymer being fluorine; wherein the weight ratio of said oxybenzoyl polyester to said polyfluorinated addition polymer is within the range from 1:100 to 100:1.

2. A composition of matter as set forth in claim 1 wherein the weight ratio of said oxybenzoyl polyester to said polyfluorinated addition polymer is within the range from 1:10 to 10:1.

3. A composition of matter as set forth in claim 1 wherein said oxybenzoyl polyester consists essentially of recurring structural units of the formula

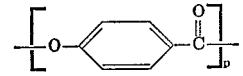

wherein $p$ is an integer from 30 to 200.

4. A composition of matter as set forth in claim 3 wherein said oxybenzoyl polyester has the formula

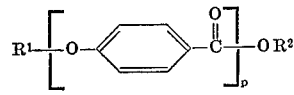

wherein $R^1$ is selected from the group consisting of benzoyl, lower alkanoyl and hydrogen; $R^2$ is selected from the group consisting of hydrogen, benzoyl and phenyl; and $p$ is an integer from 30 to 200.

5. A composition of matter as set forth in claim 4 wherein $R^1$ is hydrogen and $R^2$ is phenyl.

6. A composition of matter as set forth in claim 1 wherein said oxybenzoyl polyester consists essentially of recurring structural units of Formulas I, II and IV.

7. A composition of matter as set forth in claim 6 wherein $m$ is 0.

8. A composition of matter as set forth in claim 6 wherein $n$ is 0.

9. A composition of matter as set forth in claim 6 wherein said oxybenzoyl polyester consists essentially of from about 10 to about 70 recurring units of the formula

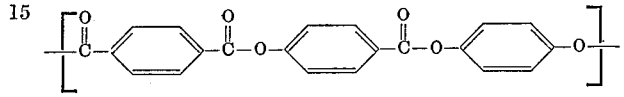

10. A composition of matter as set forth in claim 1 wherein said polyfluorinated addition polymers is selected from the group consisting of polytetrafluoroethylene and a copolymer of tetrafluoroethylene and perfluoropropylene.

11. A composition of matter as set forth in claim 5 wherein said polyfluorinated addition polymer is polytetrafluoroethylene.

12. A composition of matter as set forth in claim 5 wherein said polyfluorinated addition polymer is a copolymer of tetrafluoroethylene and perfluoropropylene.

13. A composition of matter as set forth in claim 8 wherein said polyfluorinated addition polymer is polytetrafluoroethylene.

14. A composition of matter as set forth in claim 8 wherein said polyfluorinated addition polymer is a copolymer of tetrafluoroethylene and perfluoropropylene.

15. A composition of matter as set forth in claim 1 wherein said oxybenzoyl polyester and said polyfluorinated addition polymer are both finely divided granular solids.

16. A composition of matter as set forth in claim 1 wherein said oxybenzoyl polyester and said polyfluorinated addition polymer are compacted to a heterogeneous mass.

17. A bearing of the composition of claim 1.
18. A bearing of the composition of claim 5.
19. A bearing of the composition of claim 11.
20. A bearing of the composition of claim 12.

References Cited

UNITED STATES PATENTS

| | | | |
|---|---|---|---|
| 3,033,822 | 5/1962 | Kibler et al. | 260—47 |
| 3,400,065 | 9/1968 | Barth | 204—159.2 |
| 3,444,131 | 5/1969 | Rosenbrock et al. | 260—47 |

FOREIGN PATENTS

| | | | |
|---|---|---|---|
| 938,931 | 10/1963 | Great Britain | 260—900 |
| 996,764 | 6/1965 | Great Britain | 260—900 |

MURRAY TILLMAN, Primary Examiner

J. SEIBERT, Assistant Examiner

U.S. Cl. X.R.

260—37 R, 37 M, 47 C, 860, 873

PO-1050
(5/69)

UNITED STATES PATENT OFFICE
CERTIFICATE OF CORRECTION

Patent No. 3,644,593  Dated February 22, 1972

Inventor(s) Bernard E. Nowak et al

It is certified that error appears in the above-identified patent and that said Letters Patent are hereby corrected as shown below:

Column 5, line 28, following the phrase "m is 0 or 1;" should be the phrase ---n is 0 or 1;---.

Column 6, line 7, "II" should read -- III --.

Signed and sealed this 22nd day of January 1974.

(SEAL)
Attest:

EDWARD M. FLETCHER, JR.
Attesting Officer

RENE D. TEGTMEYER
Acting Commissioner of Patents